United States Patent [19]

Masuhara et al.

[11] 3,829,973

[45] Aug. 20, 1974

[54] DENTAL AND SURGICAL BONDING-FILLING MATERIAL

[75] Inventors: Eiichi Masuhara; Nirou Tarumi, both of Tokyo; Nobuo Nakabayashi, Chiba-ken; Masahiro Baba, Tokyo; Shinsuke Tanaka, Matsudo; El Mochida, Tokyo, all of Japan

[73] Assignee: Mochida Seiyaku Kabushiki Kaisha, Tokyo, Japan

[22] Filed: Apr. 23, 1973

[21] Appl. No.: 354,155

[30] Foreign Application Priority Data
Apr. 28, 1972 Japan................................ 47-43056

[52] U.S. Cl. ..................................................... 32/15
[51] Int. Cl............................................. A61k 5/02

[58] Field of Search......................................... 32/15

[56] References Cited
UNITED STATES PATENTS

| | | | |
|---|---|---|---|
| 3,462,839 | 8/1969 | Boyer et al. ............................ | 32/15 |
| 3,469,317 | 9/1969 | Jarby et al. ............................. | 32/15 |

Primary Examiner—Robert Peshock
Attorney, Agent, or Firm—Brisebois & Kruger

[57] ABSTRACT

Dental and surgical bonding and filling material characterized by the fact that it comprises at least one polymerizable acrylic acid or methacrylic acid derivative, a vinyl polymer in powder form, and a hardening agent which is a product of the reaction between a trialkylboron and 0.3 – 0.9 mol of oxygen.

8 Claims, No Drawings

DENTAL AND SURGICAL BONDING-FILLING MATERIAL

SUMMARY OF THE INVENTION

The present invention relates to a dental and surgical bonding and filling material characterized by the fact that it comprises at least one polymerizable acrylic acid or methacrylic acid derivative, a vinyl polymer in powder form, and a hardening agent, which hardening agent is a product of the reaction between one mol of a trialkylboron and 0.3 – 0.9 mol of oxygen.

Trialkylboron is used as a polymerization catalyst for various vinyl monomers and silicon monomers. Recently, trialkylboron has been recognized as a useful hardening agent for dental bonding-filling material as described in Japanese application SHO 42–14318.

The merits of a dental bonding and filling material in which trialkylboron is used as the hardening agent and an acrylic acid or methacrylic acid derivative as the monomer lie in the following points.

First, the use of trialkylboron as the hardening agent gives a bond having a strength which has never been attained with any other hardening agent. The probable reason for this is that polymerization begins with a so-called "graft polymerization" with collagen, which is a kind of albumen constituting a part of the ivory of the teeth (See "Shikai-tenbo," 1968, Vol. 32, No. 4, P. 609).

Due to the chemical combination of the ends of the molecules of the polymerized product with the ivory of the teeth, the bond formed between the high-molecular product and the tooth is incomparably firmer than a simple physical bond.

Second, polymerization of an acrylic acid or methacrylic acid derivative with trialkylboron as the hardening agent is characterized by the fact that polymerization starts with the part where water is present. This feature is rather favorable in the case of a bonding material to be applied to a bio-system which cannot be totally deprived of water (See "Shikai-tenbo," 1968, Vol. 32, No. 4, P. 609).

Third, a bonding and filling material using an acrylic acid or methacrylic acid derivative as the monomer and trialkylboron as the hardening agent is least irritating after hardened to a bio-tissue and therefore, as a filler in a tooth cavity, it is harmless to pulpa dentis.

Fourth, this bonding material, as it hardens, exhibits a sterilizing effect. This effect is traced to the nature of this bonding material, which when hardening, makes a graft polymerization with albumen. Consequently, any microbe coming into contact with this bonding material as it hardens will be chemically combined with it.

By virtue of the above-mentioned merits, this bonding material has been highly valued for dental application as a cavity filler, but lately, other areas of application have been opened up for it.

Now, this bonding and filling material is found applicable for joining the bones of bio-systems. It is well-known that bones, just like teeth, contain much collagen. From this, it is easy to infer that this material can make a firm bond with bones. This fact has been verified through animal experiments and numerous clinical examples testify to the great value of this material. The excellence of this material as a bone-joining agent lies not only in the firmness of the bond it forms with the bones, but also in the above-mentioned sterilizing effect it exhibits as it hardens and the absence of irritation to the tissues. When any other bonding material is used in orthopedic operations and left in the bio-tissue, irritation and microbial pollution is likely to result in a very poor prognosis. When the invented bonding material is adopted, the prognosis is extremely good.

Meanwhile, possible applications of this bonding material, not only to the ivory of bone and teeth, but also the enamel of teeth, have been explored. Hitherto bonding material of this type has found no practical application to the enamel of teeth, because the enamel has a low content of collagen and the effect of this material is insufficient upon it.

The present inventors have succeeded in drastically improving the bonding effect of this material on the enamel by etching the enamel surface for about 30 seconds with a 10–70 percent phosphoric acid and then pretreating it with silane (for example, γ-methacryloxy-propyltrimethoxysilane). This treatment of the enamel surface with phosphoric acid or hydroxyethyl methacrylate produces the effect not only of eliminating the tartar deposited on the tooth surface, but also of etching the enamel to an electron-microscopic roughness, with the result that the bonding area is enlarged and the physical bonding effect is strengthened. Meanwhile, the silane at one end of the molecules forms a chelation compound with Ca in the enamel, while at the other end, which contains a methacrylic radical, it polymerizes with the bonding material. Thus, using silane, it becomes possible to produce a chemical bond between this bonding material and the tooth enamel. In this way, through synergism of physical and chemical effects, a strong bonding material with affinity to the enamel has been perfected and a wide field of dental applications has been opened.

The first application of this material is to coat the enamel part of a molar tooth, which is most subject to cavities, with this material, thereby preventing the cavities. Meanwhile, this material has made it very easy to treat the initial stage of cavity which is hard to treat by conventional methods.

The second application concerns orthodontics. In conventional orthodontic practice, a set of metal braces with various projections welded thereto at the front is attached to the teeth and, utilizing these projections, a physical force is applied by a metal wire, a spring or a rubber ring for a long time in the desired direction. After a firm bond with the tooth enamel became possible, however, a hardened plastic bracket to be attached to the tooth surface instead of the metal braces has been developed (Journal of the Japan Society of Orthodontists, 1969, Vol. 28, No. 2, P. 344, Miura, Nakagawa, Masuhara; Amer. J. Orthodont. 59 350 1971, Miura, Nakagawa, Masuhara).

The advantages of this bracket are as follows:

1. It can be more easily attached than a set of metal braces.

2. It permits brushing of the teeth better than a set of metal braces. Therefore, it causes less cavities than a set of metal braces.

3. No gap is left between adjoining teeth after treatment while the use of a set of metal braces leaves a gap.

4. It does not make the patient's appearance unsightly while being worn in the mouth for treatment, as do metal braces.

Thus, the method of polymerizing an acrylic acid or methacrylic acid derivative with trialkylboron as the hardening agent excells in many respects and its usefulness has been proved by the experience of many users. It should be remembered, however, that the trialkylboron to be employed as the hardening agent is exceedingly unstable in the air; it is a highly dangerous substance to handle, because it ignites, when exposed to the air, through reaction with oxygen. Besides, its catalytic activity deteriorates through gradual reaction with the oxygen content of the air.

For instance, tri-n-ethylboron possesses an ignition point of −20°C; of course it will ignite immediately upon being exposed to the air. By contrast, tri-n-butylboron has a slightly higher ignition point, that is 88°C, but it will ignite in a short time after exposure. Essentially, trialkylboron is characterized by the liability to react with oxygen even at lower than room temperature; and in reaction with oxygen it produces far more calories than other substances. Thus, when exposed to the air, trialkylboron reacts with oxygen and sharply increases its own temperature and that of the surrounding air to its own ignition point, thereby leading to a spontaneous ignition.

As for the inflammability, the flash point of tri-n-ethylboron is so low that it is difficult to measure. No information on this point is available from the literature. In the case of tri-n-butylboron, the flash point is as low as −20°C. Thus, use of trialkylboron involves a great handling hazard, but due to its value as a dental or surgical bonding material, there has been a persistent demand from medical circles to remove these drawbacks so that its practical advantages may be utilized in one way or another.

Various proposals have been made for this purpose. For instance, proposals have been made (Japanese Patent Application Sho 45-29195) to stabilize trialkylboron by forming a complex with amines, but when this method is used, a methyl methacrylic acid monomer is polymerized, and the resulting polymer discolors with the lapse of time.

The present inventors have succeeded in meeting the above demand by perfecting a new bonding material characterized by a very high handling safety as well as high bonding power.

According to the present invention, the hardening agent to be employed is a product of the reaction between one mol of a trialkylboron expressed by the general formula $R_3B$, where R is an alkyl group having two to eight carbon atoms, such as triethylboron, tripropylboron, tributylboron and 0.3 – 0.9 mol of oxygen; good results can be obtained by using 0.1–10 percent, or preferably about 0.5 percent, of such a product in proportion to the monomer. The monomer to be employed can be any methacrylic acid or acrylic acid derivative. To be specific, the following may be used singly or appropriately mixed: monomethacrylates such as methyl methacrylate, ethyl methacrylate, propylmethacrylate, butyl methacrylate, lauryl methacrylate; di- or trimethacrylates such as ethylene glycol dimethacrylate, diethylene glycol di-methacrylate, triethylene glycol dimethacrylate, bisphenol-A-dimethacrylate, trimethylolpropane trimethacrylate; and acrylates such as methyl acrylate and butyl acrylate.

As the vinyl polymer powder (molecular weight: between 5,000 and 800,000), the following may be used: homopolymers and copolymers of acrylic acid or methacrylic acid compounds such as polymethylmethacrylate, copolymer of methylmethacrylate, methacrylic acid and methylmethacrylate; and vinyl polymers such as styrene, polystyrene, co-polystyrene, vinyl chloride, polyvinylchloride, etc. These polymers can be used alone or with other polymers. Further, 0–85 percent of inorganic fillers such as glass beads, glass powder or a fine powder of silicic acid may be added to the vinyl polymer powder to improve the physical properties, such as wear resistance and hardness, of the bonding and filling material. When bonding is to be made on tooth enamel, the enamel surface may be preparatorily etched with a 10–70 percent phosphoric acid and thereafter, pretreated with a silane solution such as γ-methacryloxypropyltrimethoxysilane, vinyl triethoxysilane, vinyl trichlorosilane or vinyl tris (β-methoxy ethoxy) silane; and hidroxyethylmethacrylate.

It is noted that trialkylboron derivatives according to the method of this invention are possibly polymerized, hardened and bonded without mixing them with acrylic acid or methacrylic acid monomer as mentioned previously.

Next, an example of manufacturing the hardening agent according to the present invention and some experiments as to its properties will be given:

EXAMPLE OF MANUFACTURE 1

In a nitrogen stream, 36.4g (0.2mol) of tri-n-butylboron was introduced into a flask and sealed up. Then, using a vacuum pump, the inside of the flask was depressurized. While the contents were being agitated by a magnetic stirrer, the flask was maintained at 20°C with cool water applied to its outside. Oxygen was introduced at a slow rate of 0.4 $l$ per hour for reaction and the desired hardening agent was thus obtained. In the course of the reaction, when 0.1, 0.2, 0.3, 0.5, 0.7, 0.9, 1.3 and 1.5 mols of oxygen had been reacted with one mol of tri-n-butylboron, samples were taken to be used for the following experiments.

EXPERIMENT 1

Using the above samples as the hardening agent and pure tri-n-butylboron and dimethylparatoluidine, which is the conventional hardening agent for the dental resin cement, as controls, bonding and filling materials were prepared in accordance with the following recipe and their properties were examined:

| | |
|---|---|
| Hardening agent | 0.03 ml |
| Methylmethacrylate | 0.5 ml |
| Methylpolymethacrylate powder | 0.45 ml |

Using a paste of the obtained bonding and filling materials, a natural ivory piece, 10 × 10 mm in cross section and 100 mm long was joined at room temperature to a methacryl resin piece 10 × 10 mm in cross section and 100 mm long. One hour later, the joint was immersed in water at 37°C and kept there for 24 hours. Then it was placed on an autograph for measurement of the bonding strength. In the meantime, resulting bonding and filling materials were held at 37°C and, using a thermocouple inserted therein, the heat generated in hardening was measured to determine the hardening time. The flash point of the hardening agent was also measured and an ignition test thereon carried out. In the ignition test, it was determined whether a fire started or not when the hardening agent was dripped onto a piece of filter paper. Table 1 summarizes the results of these tests, i.e., the hardening time, bonding strength, flash point and the results of the ignition test. The tendency to ignite is expressed in terms of the amount of drippings necessary for the hardening agent to ignite on the piece of filter paper at room temperature, +++ indicating that ignition occurs at less than 0.05 m$l$, ++ at less than 0.1 m$l$, + at less than 0.5 m$l$; and − indicating that ignition does not occur even at 1 m$l$.

When the volume of oxygen reacting with boron trialkylate was low, the reaction product dripped onto a piece of filter paper started a fire; when the volume of oxygen was excessive, ignition did not occur but the activity of the product as a polymerization catalyst or bonding catalyst was practically lost. In the case of the hardening agent employed in the present invention, which is a product of reaction between one mol of trial-

TABLE 1

| Mols of oxygen reacted with one mol of tri-n-butylboron | 0 | 0.1 | 0.2 | 0.3 | 0.5 | 0.7 | 0.9 | 1 | 1.3 | 1.5 | Dimethylparatoluidine |
|---|---|---|---|---|---|---|---|---|---|---|---|
| Hardening time (min.) | 11 | 11 | 11.5 | 11 | 11.5 | 13 | 19.5 | 25 | 42 | 55 | 9 |
| Bonding strength (Kg/cm$^2$) | 120 | 123 | 125 | 127 | 140 | 110 | 62 | 45 | 28 | 12 | 16 |
| Flash point (°C) | −20 | −20 | 8 | 45 | 56 | 55 | 55 | 62 | 65 | 68 | unknown |
| Tendency to | +++ | +++ | + | − | − | − | − | − | − | − | − |

EXAMPLE OF MANUFACTURE 2

In a nitrogen stream, 28.0g (0.2 mol) of tri-n-propyl-boron was placed in a flask and sealed up. Then, in the same manner as in Example 1, 0.1, 0.2, 0.3, 0.5, 0.7, 0.9, 1.3 and 1.5 mols of oxygen were caused to react with one mol of tri-n-propyl-boron, thereby producing hardening agents.

EXPERIMENT 2

Using the products obtained in the above Example and tri-n-propylboron as the hardening agent, the hardening time, bonding strength and flash point were measured and an ignition test was carried out in the same way as in Experiment 1, the results being summarized in Table 2.

kylboron and 0.3 – 0.9 mol of oxygen, as evident from Tables 1 and 2, ignition does not occur even when it is dripped onto a piece of filter paper and its effect as a polymerization catalyst or bonding catalyst is fully retained. As compared with the dimethylparatoluidine presently in common use, it excels in bonding power and accordingly it finds versatile applications as a bonding agent in orthodontics, a bonding and filling agent for tooth cavity prevention, dental cement or a bonding agent in orthopedics. Its effect is not inferior to that resulting from the direct use of trialkylboron; with respect to safety and convenience in dental and orthopedic aplications, it is far better.

The following are some examples of its practical applications.

TABLE 2

| Mols of oxygen reacted with one mol of tri-n-propylboron | 0 | 0.1 | 0.2 | 0.3 | 0.5 | 0.7 | 0.9 | 1 | 1.3 | 1.5 |
|---|---|---|---|---|---|---|---|---|---|---|
| Hardening time (min.) | 13.5 | 13 | 14 | 13.5 | 14 | 16.5 | 19 | 28 | 44 | 55 |
| Bonding strength (Kg/cm$^2$) | 95 | 98 | 102 | 106 | 115 | 97 | 52 | 27 | 16 | 10 |
| Flash point (°C) | −28 | −23 | 4 | 36 | 51 | 54 | 57 | 60 | 63 | 65 |
| Tendency to ignite | +++ | ++ | + | − | − | − | − | − | − | − |

As seen from Tables 1 and 2, the bonding-filling material of this invention using as the hardening agent a product of the reaction of 0.3 – 0.9 mol of oxygen with trialkylboron far excels the conventional bonding material for dental and orthopedic purposes in the bonding strength; the result is practically the same even when tri-n-butylboron is used. Meanwhile, the hardening agent to be employed in the present invention possesses a higher flash point than tri-n-butylboron and, as apparent from the results of filter paper test, it does not ignite.

EXAMPLE OF APPLICATION 1

A fresh crown of a cow's tooth was ground flat to expose the enamel portion. This was stored in water at 37°C. Just before testing, it was taken out of water and wiped clean of water on the surface, treated with an aqueous solution of 50 percent phosphoric acid, flushed with water, dried, and then coated with one layer of a γ-methacryloxypropyltrimethoxysilane solution.

The surface of this cow's tooth was coated with a pasty mixture of 0.03 m$l$ of the product of a reaction between one mol of tri-n-butylboron and 0.5 mol of oxygen as the hardening agent; 0.4 ml of methyl methacrylic acid; 0.05 ml of methacrylic acid monomer; and 0.4 g of polymethylmethacrylic acid (molecular weight: 800,000). Upon this coated surface a stick of acrylic resin was pressed to harden. The whole thing was immersed in water at 37°C and held there for 24 hours, after which it was measured for its bonding strength on an autograph. The strength turned out to be 60 kg/cm$^2$ and hardening took 11 minutes at 37°C.

Since the bonding composition according to the present invention is characterized by remarkable bonding power to the enamel, it is useful for direct joining of plastic brackets in orthodontics or for attaching teeth suffering from pyorrhea alveolaris.

EXAMPLE OF APPLICATION 2

By blending 0.03 ml of a hardening agent obtained by reaction between one mol of tri-n-butylboron and 0.6 mol of oxygen; 0.45 ml of methyl methacrylic acid; 0.05 ml of triethyleneglycol dimethacrylate, and 0.5g of a mixture of 80 parts of polymethylmethacrylic acid (molecular weight: 120,000) powder and 20 parts of glass powder, a pasty substance was prepared. Then, in the same manner as in Experiment 1, a piece of ivory having a square section and a square of methacryl resin having a square section were joined together. The bonding strength of the resulting joint turned out to be 92 kg/cm$^2$ and its hardening took 10 minutes at 37°C.

Containing glass powder, this composition is superior in wear resistance and is found useful as a bonding and filling material for tooth cavity prevention and treatment.

EXAMPLE OF APPLICATION 3

By blending 0.03 ml of a hardening agent obtained by reaction between one mol of tri-n-propylboron and 0.7 mol of oxygen; 0.45 ml of methyl methacrylic acid; 0.05 ml of butyl acrylic acid and 0.4 g of a powder (less than 250 mesh) of a copolymer (molecular weight: 300,000) between methyl methacrylic acid and α-methylstyrene, a paste was produced. Then, in the same manner as in Experiment 1, and using hydroxyethylmethacrylate in place of γ-methacryloxypropyltrimethylsilane, a piece of fresh ivory having a square section and a piece of acryl resin having a square section were joined together. The resulting joint, after being immersed in water at 37°C for 24 hours, was tested for bonding strength, which turned out to be 105 kg/cm$^2$, the hardening time being 10 minutes at 37°C.

This paste is found useful as a bonding material for othodontics.

EXAMPLE OF APPLICATION 4

By blending 0.025 ml of a hardening agent obtained by reaction between one mol of tri-n-butylboron and 0.7 mol of oxygen; 0.4 ml of methyl methacrylic acid; 0.1 ml of diethyleneglycoldimethacrylate and 0.7g of a mixture of 60 parts of polymethyl methacrylic acid (molecular weight: 5,000) (less than 250 mesh) and 40 parts of glass powder (less than 325 mesh), a paste was prepared. Then, in the same manner as in Experiment 1, a piece of fresh ivory having a square section and a piece of acryl resin having a square section were joined together. The resulting joint, after being immersed in water at 37°C for 24 hours, was tested for its bonding strength, which turned out to be 86 kg/cm$^2$, the hardening time being 11 minutes at 37°C.

When it contains a fine glass powder, this paste is highly wear-proof and its thermal expansion-contraction is so small that it makes an excellent dental cement.

EXAMPLE OF APPLICATION 5

By blending 0.03 ml of a hardening agent obtained by reaction between one mol of tri-n-octylboron and 0.3 mol of oxygen; 0.48 ml of methyl methacrylic acid; 0.02 ml of ethyleneglycol dimethacrylate and 0.45 g of polymethylmethacrylic acid powder (molecular weight: 300,000) (average size: 200 mesh), a paste was obtained. A fresh thigh bone of an adult dog was coated with this paste and a stick of acryl resin, 10 × 10 mm in cross section and 100 mm long, was pressed thereagainst and left to harden. After hardening, the joint obtained was immersed in water at 37°C and maintained for 24 hours, after which it was tested for bonding strength, which turned out to be 120 kg/cm$^2$, the hardening time of the paste being 10 minutes.

Thus, the bonding material according to the present invention is found useful not only for dental purposes but also for orthopedic purposes for firmly joining bones.

What is claimed is:

1. Dental and surgical bonding and filling material which comprises at least one polymerizable product selected from the group consisting of acrylic acid and methacrylic acid derivatives, at least one vinyl polymer, and the reaction product of a trialkylboron with from 0.3 to 0.9 mol of oxygen.

2. Material as claimed in claim 1 in which trialkylboron is selected from trialkylboron expressed by the general formula $R_3B$, wherein R represents an alkyl group having two to eight carbon atoms.

3. Material as claimed in claim 1 in which said vinyl polymer is in powdered form and selected from the group consisting of styrene, vinyl chloride, and homopolymers and copolymers of acrylic acid and methacrylic acid.

4. Material as claimed in claim 1 which also comprises at least one granular inorganic filler.

5. The method of making a dental and surgical bonding and filling material which comprises the step of polymerizing a product selected from the group consisting of acrylic acid and methacrylic acid derivative, using the reaction product of trialkylboron with from 0.3 to 0.9 mol of oxygen as the hardening agent.

6. The method of making a dental and surgical bonding and filling material which comprises the steps of reacting a trialkylboron with from 0.3 to 0.9 mol of oxygen while maintaining the temperature of trialkylboron below its ignition point.

7. The method of bonding a piece of synthetic resin to bone or tooth material which comprises the step of first coating the surface of said material with an α-methacryloxy-propyltrimethoxysilane solution, then coating said surface with the reaction product of an acrylic or methacrylic acid with 0.3 to 0.9 mol of oxygen, and finally pressing said piece of resin against said surface until said reaction product hardens.

8. The method claimed in claim 7 which comprises the step of etching said surface with phosphoric acid before being coated with said solution.

* * * * *